United States Patent
Xu et al.

(10) Patent No.: US 10,537,814 B2
(45) Date of Patent: Jan. 21, 2020

(54) SCREEN CODING METHODS AND CAMERA BASED GAME CONTROLLER FOR VIDEO SHOOT GAME

(71) Applicants: Liwei Xu, Pleasanton, CA (US); Alan Xu, Pleasanton, CA (US)

(72) Inventors: Liwei Xu, Pleasanton, CA (US); Alan Xu, Pleasanton, CA (US)

( * ) Notice: Subject to any disclaimer, the term of this patent is extended or adjusted under 35 U.S.C. 154(b) by 383 days.

(21) Appl. No.: 15/376,363

(22) Filed: Dec. 12, 2016

(65) Prior Publication Data

US 2017/0182425 A1 Jun. 29, 2017

Related U.S. Application Data

(60) Provisional application No. 62/271,250, filed on Dec. 27, 2015.

(51) Int. Cl.
*A63F 13/837* (2014.01)
*A63F 13/53* (2014.01)
*A63F 13/25* (2014.01)
*A63F 13/213* (2014.01)
*A63F 13/211* (2014.01)
*A63F 13/245* (2014.01)
*G06F 3/03* (2006.01)

(52) U.S. Cl.
CPC .......... *A63F 13/837* (2014.09); *A63F 13/211* (2014.09); *A63F 13/213* (2014.09); *A63F 13/245* (2014.09); *A63F 13/25* (2014.09); *A63F 13/53* (2014.09); *G06F 3/0304* (2013.01); *A63F 2300/8076* (2013.01)

(58) Field of Classification Search
CPC ....................... G06F 3/0304; A63F 2300/8076
See application file for complete search history.

(56) References Cited

U.S. PATENT DOCUMENTS

| | | | |
|---|---|---|---|
| 5,926,168 A * | 7/1999 | Fan | G06F 3/0325 345/158 |
| 6,929,548 B2 | 8/2005 | Wang | |
| 8,754,846 B2 | 6/2014 | Cheng et al. | |
| 2003/0199325 A1* | 10/2003 | Wang | A63F 9/0291 463/51 |
| 2006/0284841 A1* | 12/2006 | Hong | G06F 3/0346 345/157 |

(Continued)

*Primary Examiner* — Robert T Clarke, Jr.
(74) *Attorney, Agent, or Firm* — Stephen E. Zweig

(57) ABSTRACT

Camera base game controller, system and methods for video shooting games. The game controller is gun shaped which comprises a sight, camera, embedded computer, wireless communication, etc. A player aims at a target on TV screen with sight and captures pictures with camera. The sight's central axis points to a point on TV, known as "hit point" which is a point-of-aim on TV screen the player aiming to. The sight will project hit point to the picture center. Several methods, including algorithm with mathematical method, 1D and 2D screen coding methods are described to calculate the hit point coordinate on TV screen. The game controller will send this coordinate wirelessly to game computer, which connects to TV and will determine whether a target on TV is hit or not, and reacts accordingly. An alternative game controller design using smart phones directly for its camera and embedded computer is described also.

18 Claims, 13 Drawing Sheets

(56) References Cited

U.S. PATENT DOCUMENTS

| | | | | |
|---|---|---|---|---|
| 2008/0122786 | A1* | 5/2008 | Pryor | A63F 13/02 345/156 |
| 2008/0180395 | A1* | 7/2008 | Gray | G06F 3/0346 345/157 |
| 2009/0167679 | A1* | 7/2009 | Klier | G06F 3/0304 345/157 |
| 2010/0069152 | A1* | 3/2010 | Nishimura | A63F 13/10 463/31 |
| 2010/0188333 | A1* | 7/2010 | Capps | G06F 3/03542 345/157 |
| 2014/0104169 | A1* | 4/2014 | Masselli | G01B 11/00 345/157 |
| 2014/0191957 | A1* | 7/2014 | Cheng | G06F 3/0321 345/157 |
| 2014/0349254 | A1* | 11/2014 | Lohbihler | F41G 3/2655 434/22 |
| 2016/0138895 | A1* | 5/2016 | Beine | F41J 5/02 434/19 |
| 2016/0224128 | A1* | 8/2016 | Shigeta | G06F 3/011 |
| 2018/0252491 | A1* | 9/2018 | Son | F41G 3/2655 |
| 2018/0356903 | A1* | 12/2018 | Sugimoto | G06F 3/0386 |

* cited by examiner

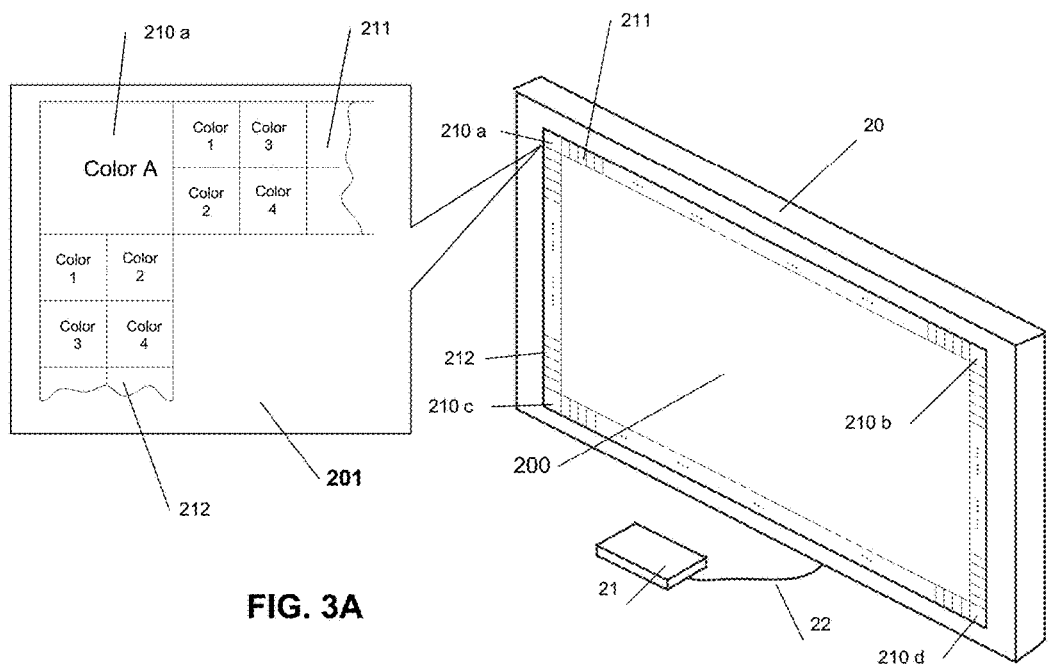
FIG. 3A
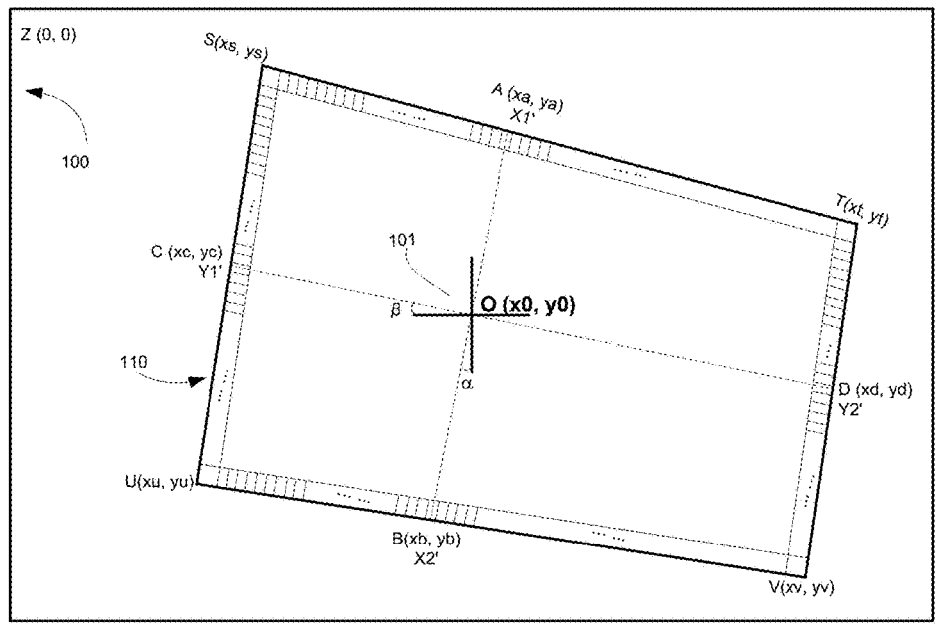
FIG. 3B  FIG. 3C

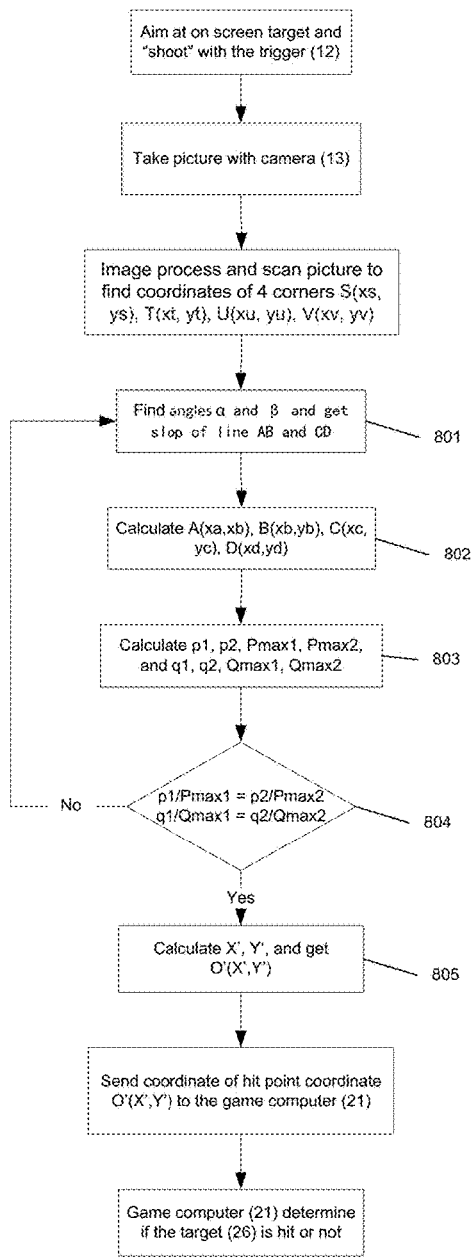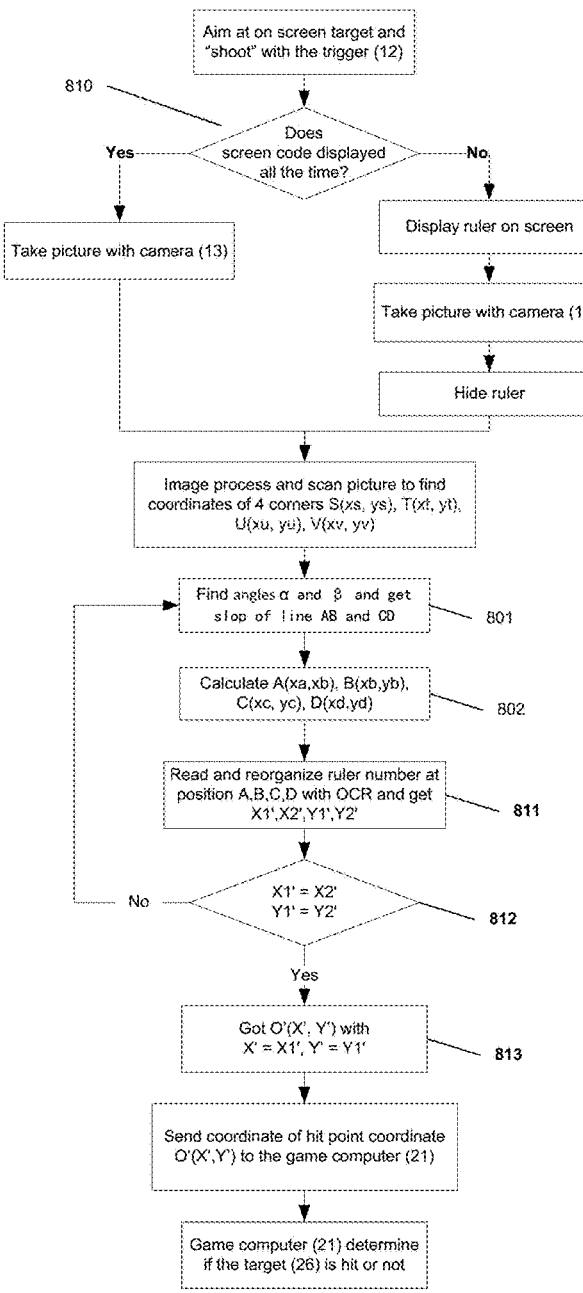
FIG. 5A
FIG. 5B

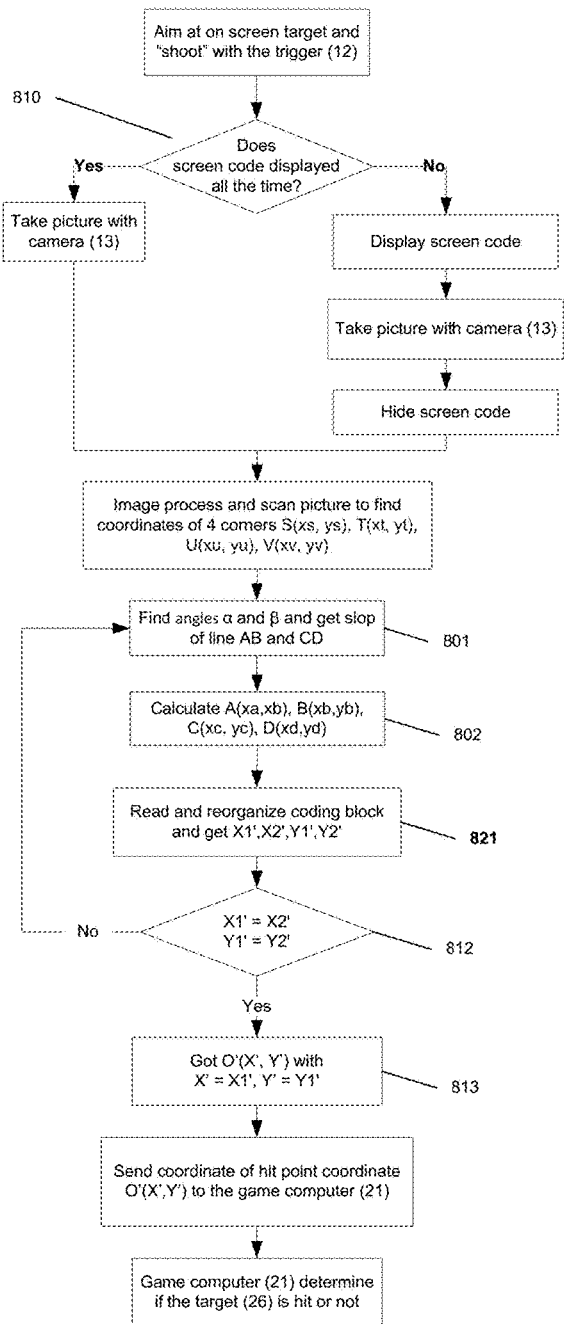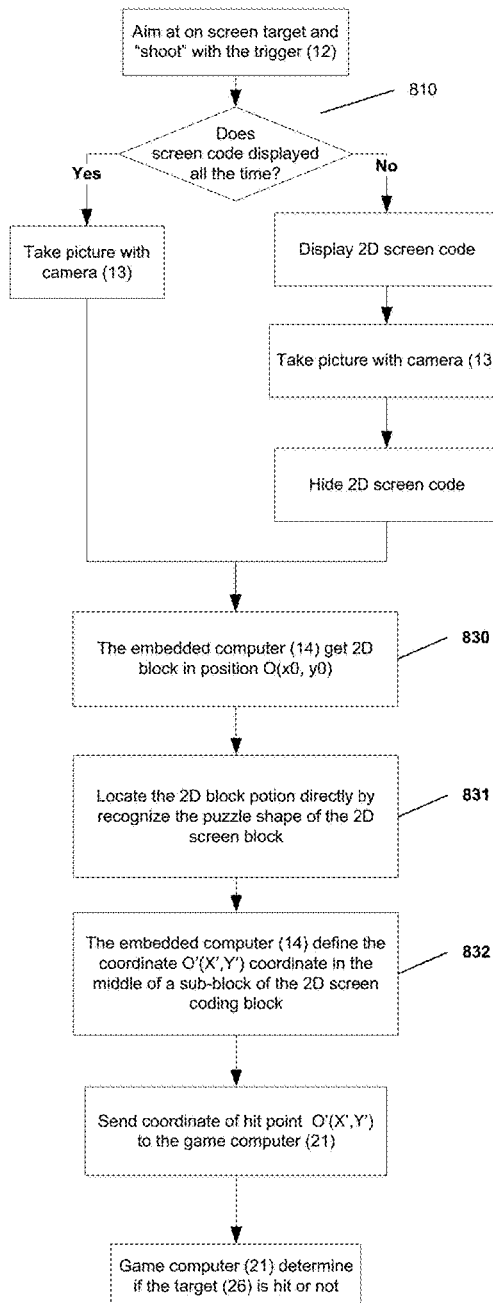
Fig. 5C
Fig. 5D

SCREEN CODING METHODS AND CAMERA BASED GAME CONTROLLER FOR VIDEO SHOOT GAME

CROSS-REFERENCES TO RELATED APPLICATIONS

This application claims the benefit of provisional patent application, App No. 62/271,250, filed on Dec. 27, 2015 by the first named inventor of this application.

BACKGROUND OF THE INVENTION

1. Field of the Invention

The present invention relates generally to methods and apparatus for a video shooting game and more specifically to video shooting game for simulated-projectile with process data and calculate coordinate of a point-of-aim (i.e. target) on display screen.

The present invention also relates to education and demonstration of gun aiming and shooting with simulated-projectile for instruction and practice purpose.

2. Description of Prior Art

Video shooting games are popular and fun. However, most such video shooting games in market are using computer peripherals, such as a keyboard, a mouse or a joystick to aim and shoot at visual targets on a display screen. Other game devices, such as PLAYSTATION, XBOX, Wii, etc. use their remote controllers to aim and shoot at visual targets on a display screen. These types of peripheral devices or remote controllers make video shooting games less realistic.

Many efforts have been made in last decade to make use of computer based shooting devices, such as a mock gun, in video shooting games. The key issue of these efforts is how to find the hit point coordinate on a display screen (TV screen) correctly and accurately by computer software. A hit point is a point-of-aim (i.e. target) on display screen a player is aiming to with a mock gun.

One such an attempt was described in the U.S. Pat. No. 8,754,846 by Cheng et al. This prior art installs two infrared light sources on top of a display screen (TV screen), and installs an image sensor in a mock gun. A light filter is installed in front of the image sensor which allows only the light with the same wavelength of the infrared light to pass through to the image sensor. A picture of infrared light sources on display screen top will be captured when a game player "shoot" a target on the display. The image in picture has only two light spots and some background noise because the light filter only allows infrared light to pass through. The system is suppose the picture center is the "hit point", which is a point on display screen a player is aiming to. The system try to use the position of two light spots in a picture, the picture center, and their relationship to the physical measurement of display screen (width and length) to calculate the coordinate of a hit point on the display screen.

In practice, this method is hard to get a correct x-y coordinate on the display screen with only light two spots in a picture, because: (1) Have no aiming mechanism to guarantee a point on display screen a user is aiming to is projected to the picture center; (2) The position calculation cannot be accurate because the two infrared light sources on display screen top can only provide reference for X-direction (horizontal), but no reference for Y-direction (vertical); (3) Physical measurement of display screen (width and length) will be distorted in a picture because the central axis of the image sensor in gun-shaped controller is not always perpendicular to the display screen center, therefore, the relationship of two light spots in a picture and physical measurement of display screen cannot be always maintained. The calculation based on such a relationship could not be correct.

Another attempt was described in the U.S. Pat. No. 6,929,548 by Xiaoling Wang. The shooting game system in this prior art comprises a display screen (TV screen) with a video camera installed on TV top; a mock shooting device (mock gun) consisting of several light source; and a computer connecting the video camera and the mock gun with cables. A game player uses the mock gun to aim and "shoot" at visual target on display screen, which trigs the camera mounted on TV screen top to capture a picture of the light source on mock gun. The connecting computer will then calculate the x-y coordinate of the hit point on display screen with the algorithm.

The main algorithm of this prior art is based on a research paper "Pose estimation using four corresponding points", Published in 1999 by M. L. Liu and K. H. Wong. This paper described a "model-based pose estimation system", which estimates an object's pose based on an image of four points on the object with a known distance between object and camera.

The algorithm calculate x-y coordinate of the hit point on display screen indirectly based on the estimated mock gun pose and the known distance between mock gun and camera on TV top.

The problems in the algorithm of this prior art could be (1) The mathematical computing in "model-based pose estimation" is very complex which could take considerable time to finish and result in game player feel the projectile flying time is too long; (2) The algorithm only works with a known distance between camera and mock gun, which is not practical for a real video shooting game because distance between camera and mock gun is unknown. A game player could move around in playing a game; (3) The system need to use a calibrated camera with a focal length for the fixed distance between camera and mock gun. The camera need to re-calibration if distance is changed due to game player move, which is not practical.

BRIEF SUMMARY OF THE INVENTION

The present invention is a method and apparatus for a video shooting game to resolve the problem of finding the hit point coordinate on a display screen (TV screen) correctly and accurately by computer software. A hit point is a point-of-aim on TV screen a player is aiming to with a mock gun.

The method and apparatus work together in a system comprise a display screen (TV screen), such as a LED/LCD flat TV or a computer monitor; a game computer which could be any kind of TV box, such as Apple TV, FireTV, etc. Video display and game computer are connected with a standard video cable, such as a HDMI cable. Game computer displays game scene on the display screen (TV screen). The apparatus in the present invention is a mock shooting device (a mock gun) which interacts with the game computer via wireless communications, such as WIFI or Bluetooth.

The apparatus in one embodiment is a camera based game controller (mock gun), which is gun shaped, and comprises an optical or electrical sight, a trigger, a camera, an embedded computer, an operation panel, wireless communication, motion sensors, a battery, and LED light, audio, a vibrator, etc. The optical or electrical sight is the aiming mechanism for a game player to aim at a visual target on the TV screen. The central axis of sight is the trajectory and is pointing to a point on TV screen, known as hit point (point-of-aim). The hit point on TV screen will be projected to the picture center by optical or electrical sight.

The apparatus in another embodiment directly use a modern smart phone, such as iPhone or Android phone, as the camera, embedded computer and operation panel in camera based game controller.

A game player uses the mock gun to aim at an on screen target and "shoots" it, which trigs camera in mock gun to capture a picture of TV screen and project the hit point on screen to the picture center. The embedded computer inside mock gun then analysis the image in picture and calculates the hit point coordinate on screen using methods in present invention, and sends it to the game computer with wireless communication. The game computer will determine if the target is hit or not once received the coordinate signal and react accordingly.

The methods in present invention are designed to calculate a hit point coordinate on the TV screen based on the relationship of picture center and the captured TV screen image in picture. This method requires all four TV screen corners are taken into a single picture, and the hit point is projected to the picture center.

The method in one embodiment is an algorithm using mathematical method to calculate the hit point coordinate on TV screen based on the relationship between the picture center and the whole TV screen image in picture.

The method in another embodiment is on screen ruler method, which displays rulers on four edges of the TV screen. The scales on rulers represent TV screen coordinate directly and accurately. The idea behind the on screen ruler method is use said algorithm to calculate the picture center's position relative to TV screen image in the captured picture and then read the ruler scale correspond to this position to determine the hit point coordinate on TV screen directly.

The method in another embodiment is one dimensional (1D) screen coding method, which use screen coding to replace the said on screen rule to improve the calculation speed because 1D screen coding is much easier for software to read and identify than the said on screen ruler, especially for images with certain blurry. 1D screen coding comprises corner blocks and coding blocks, each identified with different colors. 1D screen coding blocks are arranged in a series that each combination of two or more neighbored coding blocks in the series is unique, and has one and only one position in the series. The software can easily determine the hit point coordinate on TV screen by calculating the picture center's position relative to TV screen image in the captured picture with the said algorithm and then identify a pair of neighbored coding blocks at the place corresponding to this position.

The method in another embodiment is called two dimensional (2D) screen coding method, which is good for huge TV screen, such as a screen wall, and TV screen image is too large to be taken into a single picture. 2D screen coding blocks are displayed on TV screen directly as a background, and organized in a screen area. Each 2D screen coding block is identified by puzzle line, bar code, or any other methods in order to make each coding block unique in a screen area, in other word, each 2D screen coding block has one and only one location in the screen area. The method could easily determine the hit point coordinate on TV screen by recognizing one 2D screen coding block located at the picture center, because the hit point is projected to the picture center and the 2D screen coding block located at the picture center represent one and only one location in a screen area.

BRIEF DESCRIPTION OF THE DRAWINGS

FIG. 3A is another embodiment of screen coding methods: one dimensional coding method FIG. 3B is a table to define one dimensional coding blocks with different colors FIG. 3C is a description of use one dimensional coding method to find the coordinate of hit point on screen.

FIG. 5A is flowcharts for calculating a hit point coordinate using the algorithm described in FIG. 2B.

FIG. 5B is flowcharts to determine a hit point coordinate using on screen ruler method.

FIG. 5C is flowcharts to determine a hit point coordinate using 1D screen coding method.

FIG. 5D is flowcharts to determine a hit point coordinate using 2D screen coding method.

DETAILED DESCRIPTION OF THE INVENTION

Figure 1:
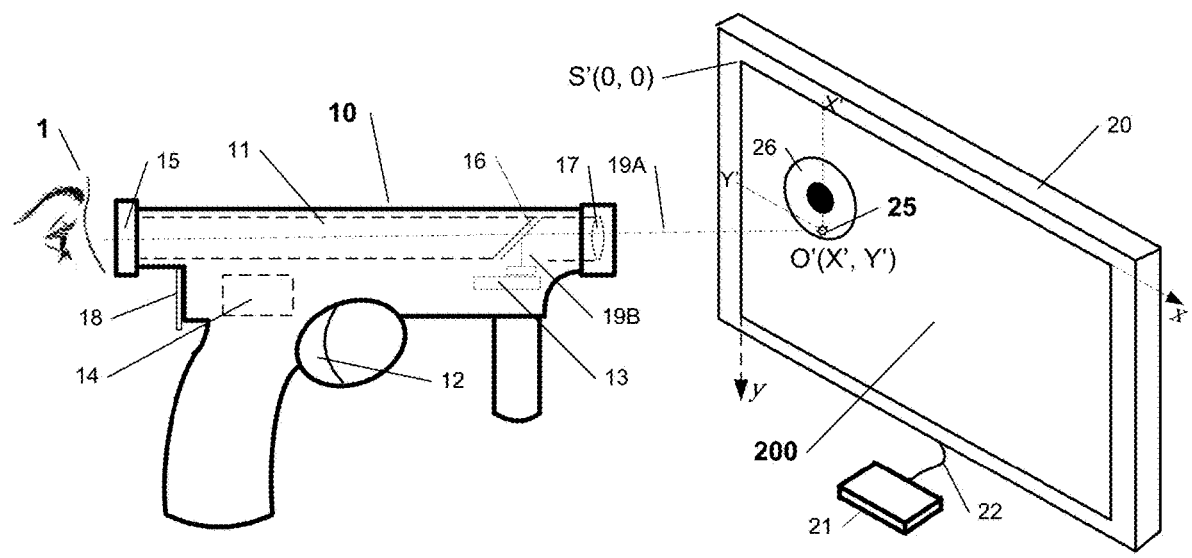
FIG. 1 is system of video shoot game and TV screen coordinate system.

FIG. 1 shows a system of video shoot game with a game controller (10) and a video display (20). (200) is the screen of the video display (20). The screen (200) is called "TV screen", which has known size, in pixels, such as 1920× 1080. The whole area of the TV screen (200) is defined as TV screen coordinate system (called x-y system), whose origin is S'(0, 0). (25) is "hit point", which is a point-of-aim on TV screen a player is aiming to with a mock gun. O'(X',Y') is coordinate of a hit point (25) in the x-y system.

Figures 6A, 6B:
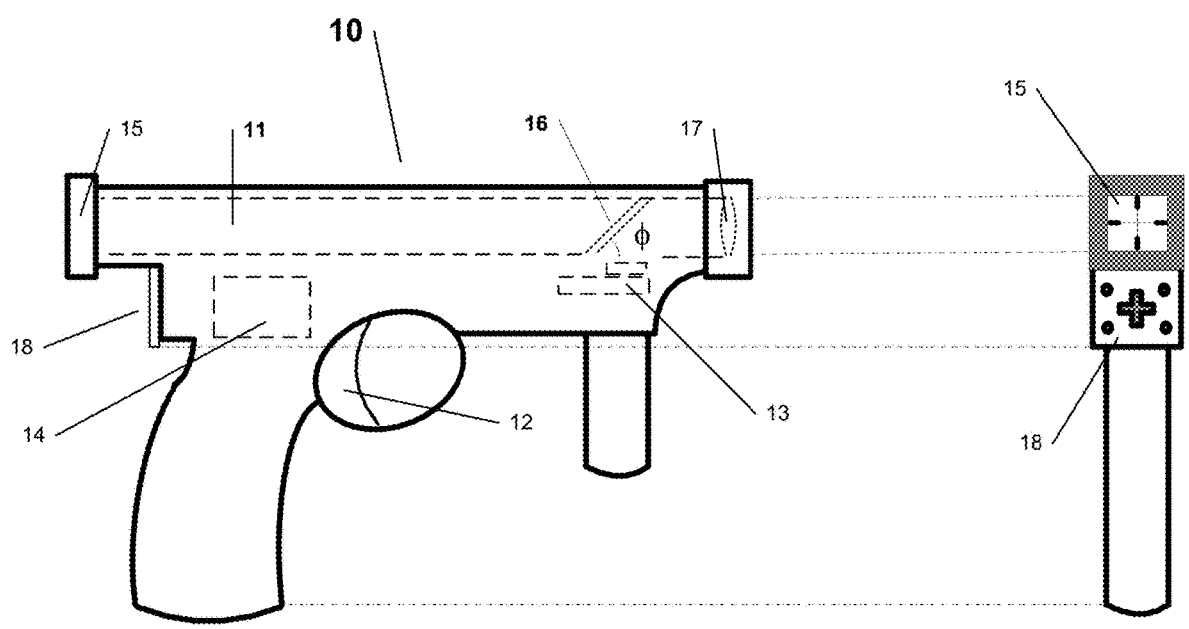
FIG. 6A is an embodiment of game controller's right side view and its design
FIG. 6B is an embodiment of game controller's rear view

The Game controller (10) is a mock gun, which is camera based, and comprises an optical or electrical sight (11), a trigger (12), a compact camera with or without any kind of image stabilization (13), an embedded computer (14), an operation panel (18), wireless communication, a motion sensor, a battery, and LED light, audio, a vibrator, etc., its detailed design is described in FIG. 6A. One embodiment of optical sight (11) contains a translucent mirror (16), which let certain amount of light passes directly through to eyepiece (15), and the rest of light is reflected to the camera (13). The central axis (19A) of optical sight (11) is the trajectory, which passes through the center of eyepiece (15) and the center of translucent mirror (16), and is pointing to a point on TV screen, known as hit point (25). The central axis (19B) of the camera's optical center is perpendicular to (19A) at the center of translucent mirror (16). Both images shown on eyepiece (15) and in picture captured by camera (13) are concentric by means of the translucent mirror (16). The purpose of this design is to project the hit point (25) to the center of a picture capture by camera (13). The detailed design about optical sight (11) is described in FIG. 7.

The game controller (10) is safe to use, it has no gun barrel to emit light beam or shoot physical projectile, it only captures pictures. The major functions of a game controller (10) include:

1. Help a game player (1) to aim at the target (26) displayed on screen (200);
2. Capture pictures of the screen (200);
3. Calculate the coordinate O'(X',Y') of hitting point (25); and then
4. Send the coordinate O'(X',Y') to game computer (21) via wireless communication and let the game computer to determine if the target is hit or missed, and react accordingly.
5. Send all user input (button click) on operation panel (18), such as start game, stop game, game selection, etc. to game computer (21) via wireless communication The game controller (10) is a peripheral to game computer (21) via wireless communication. A video display (20) is connected to a game computer (21) with a video cable (22), such as a HDMI cable. The Game controller (10) communicates to the game computer (21) with wireless communication, such as WIFI or blue tooth, to perform an interactive video shoot game.

The video display (20) could be any kind of TV, projector, or computer monitor. The game computer (21) could be any kind of TV Set Top Box, such as Apple TV, FireTV, etc., or a game console, such as Xbox, Play Station, Wii, etc. A video cable (22) is HDMI or a cable with any standard analog or digital video interface.

A game player (1) uses operation panel (18) to start a game and aims at an on screen target (26) with the sight (11), and then use trigger (12) to "shoot" it, which will trig camera (13) to capture a picture of screen (200). The embedded computer (14) then processes the image in picture and calculates the coordinates O'(X',Y') of hit point (25) on screen (200), and sends it to the game computer (21) via wireless communication.

The game computer (21) will determine if the target (26) is hit or not once received the coordinate signal and react accordingly. In the moment of trig, LED light, audio, and vibration in the game controller (10) will be turned on for a short time to simulate a gun shoot effect.

Figure 2A:
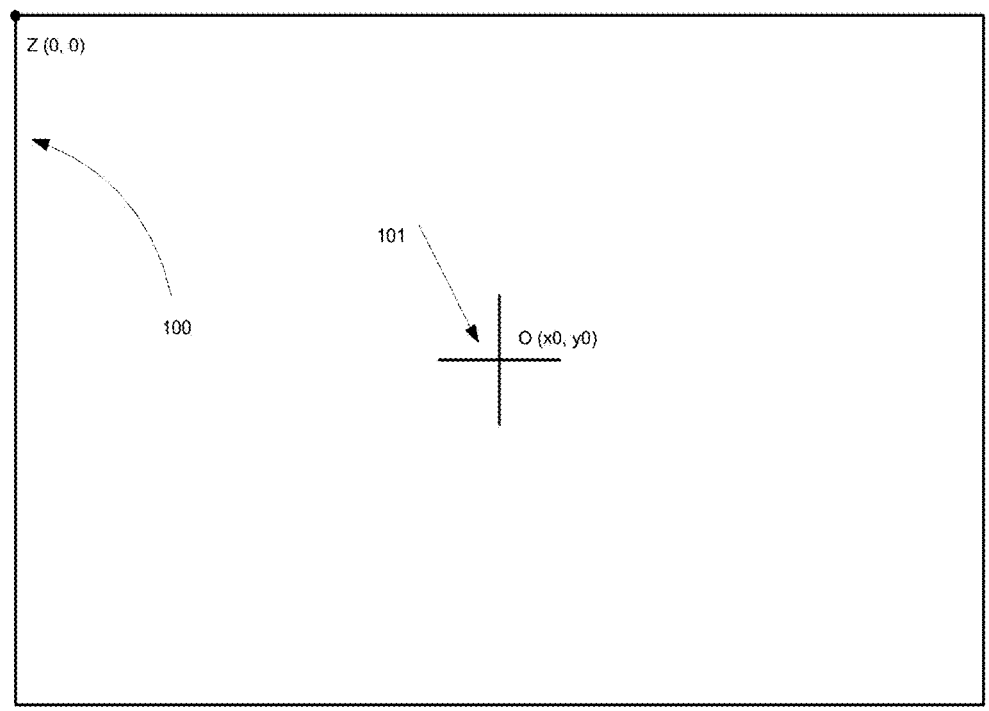
FIG. 2A is picture coordinate system in a blank picture captured by the camera in game controller.

FIG. 2A is a blank picture captured by camera (13). The whole blank picture area is defined as the picture coordinate system (100), where the origin is Z(0,0). The picture coordinate system (100) has known size of width and height, in pixels. The picture center O(x0, y0) is defined by center of reticle (101) which is captured into picture from the translucent mirror (16). A reticle is printed on the center of translucent mirror (16) and a game player (1) could see it on the eyepiece (15) and use it to aim at a target (26) on screen (200), but it will not be shown on TV screen (200). The reticle is projected to the picture center because the optical sight central axis (19A) is go through the reticle center on the translucent mirror (16), and the center of eyepiece (15), and pointing to hit point (25) on TV screen (200). The camera optical center's central axis (19B) is perpendicular to (19A) at the point of translucent mirror center marked by reticle, and therefore, the reticle along with the hit point (25) will be projected to the picture center by means of the translucent mirror (16). The detailed description about optical sight (11) is in FIG. 7.

Figure 2B:
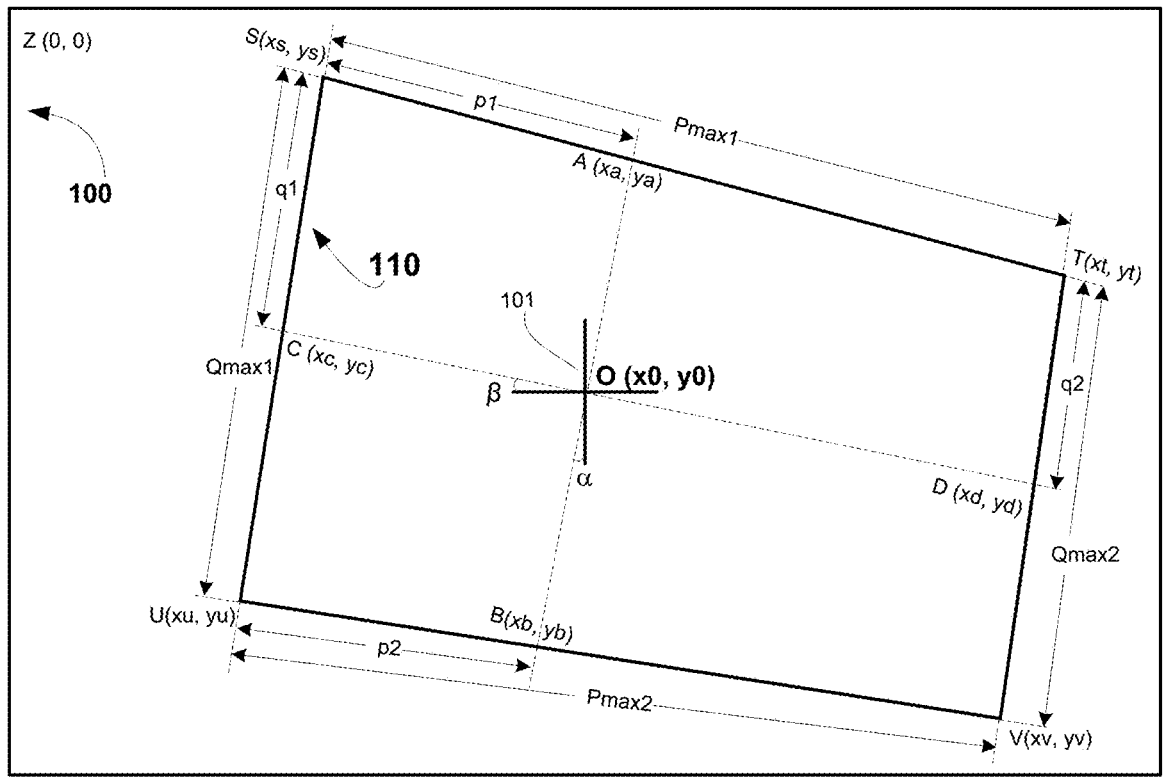
FIG. 2B is a picture coordinate system with TV screen captured in. An algorithm to calculate the coordinate of hit point on screen is described in detail.

FIG. 2B is a picture with the TV screen (200) captured in. An algorithm for calculating O'(X',Y') is described here.

(100) is the picture coordinate system which is the whole picture area, as described in FIG. 2A. The inside smaller quadrilateral (110) is an abstracted image of the screen (200) in picture, which could not be a rectangle because the game controller is used in as many as six dimensional freedoms, including translations and rotations.

O(x0,y0) is the picture center defined by reticle (101). S(xs, ys), T(xt, yt), U(xu, yu), V(xv, yv) are four corners of the quadrilateral (110) which represent four TV screen corners. The origin point S'(0,0) and hit point O'(X',Y') in TV screen coordinate system (x-y system) are projected to S(xs, ys) and O(x0,y0) in picture coordinate system (100) respectively. A(xa, ya), B(xb, yb), C(xc, yc), D(xd, yd) are boundary points of the quadrilateral (110), which are helpful to calculate the hit point (25) coordinate O'(X',Y'). The dash line AB and CD are auxiliary lines which are not displayed on TV screen (200). Note that O(x0,y0), S(xs, ys), T(xt, yt), U(xu, yu), V(xv, yv), A(xa, ya), B(xb, yb), C(xc, yc), D(xd, yd) are coordinates in picture coordinate system (100).

The most important purpose of the present invention is to calculate the hit point coordinate of O'(X', Y') in TV screen coordinate system (x-y system), which could be achieved with the following algorithm:

Step 1: Estimate angles $\alpha$ and $\beta$

Step 2: Find C(xc, yc) with angle $\beta$ and calculate q1, which is the length of line segment SC, Step 3: Find D(xd, yd) with angle $\beta$ and calculate q2, which is the length of line segment TD Step 4: Determine Qmax1, which is the length of line SU, the left edge of quadrilateral (110)

Step 5: Determine Qmax2, which is the length of line TV, the right edge of quadrilateral (110)

Step 6: Check if q1 and q2 has equalized ratio $$\frac{q1}{Q\text{max}1} = \frac{q2}{Q\text{max}2}?$$

If not equal, adjust angle $\beta$ and go through equation 4 and 5 again, until find the equalized ratio $$\frac{q1}{Q\text{max}1} = \frac{q2}{Q\text{max}2}.$$

The equalized ratio is direct proportional to coordinate value Y' in x-y system, and y=Y' is a horizontal line parallel to x axis of x-y system. It means that Y' in x-y system has same coordinate value on both left and right edge of screen (200). The same concept is apply to coordinate value X' in x-y system.

Step 7: Find the result Y'

$$Y' = \frac{q1}{Q\text{max}1} \times Ytv;$$

where Ytv is TV y-direction resolution in pixel, e.g. Ytv=1080 for a TV with 1920×1080 resolution Step 8: Fine p1 and Pmax1 with the same way to resolve q1 and Qmax1, and then use the following equation to find X'

$$X' = \frac{p1}{P\text{max}1} \times Xtv;$$

where Xtv is TV x-direction resolution in pixel, e.g. Xtv=1920 for a TV with 1920×1080 resolution The O'(X', Y') is the coordinate of the hit point (25) in the TV screen coordinate system (x-y system), as described in FIG. 1. The most important idea behind the algorithm is using the equalized ratio to determine the coordinate value X' and Y' in x-y system on the quadrilateral (110) in the picture.

Figure 2C:
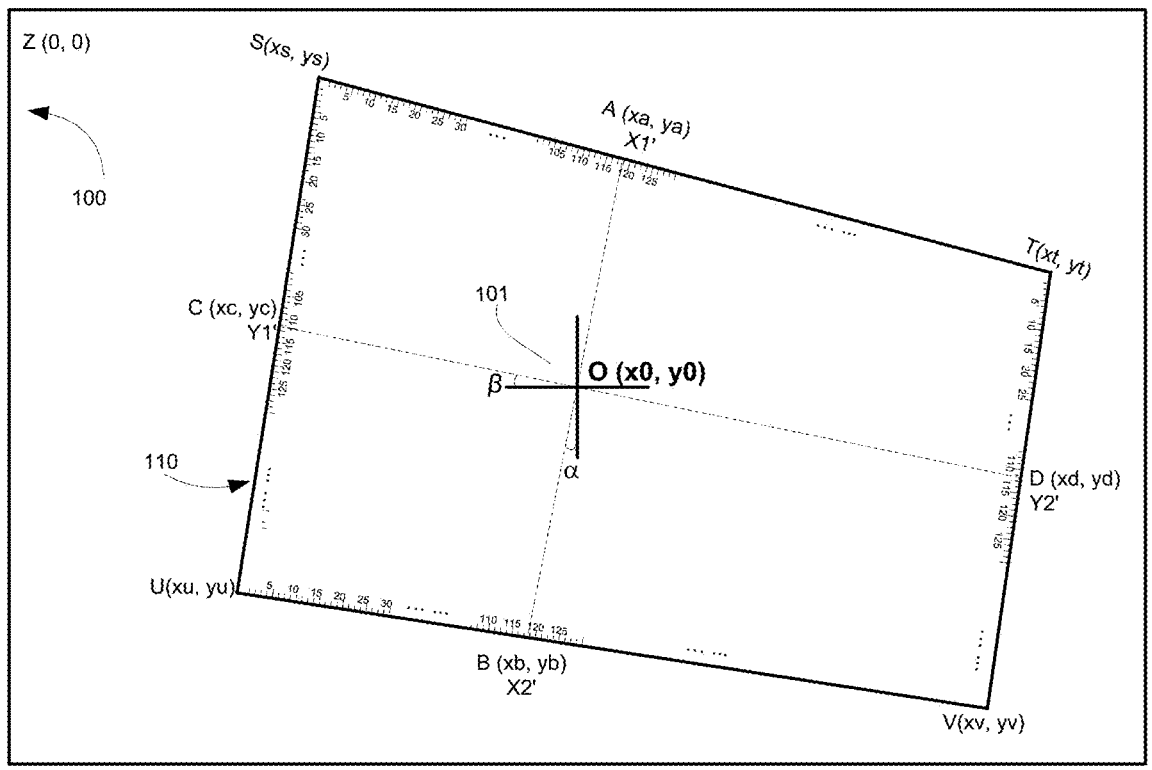
FIG. 2C is an embodiment of screen coding methods: on screen ruler method and use it to determine the coordinate of hit point on screen.

FIG. 2C is an embodiment of a screen coding method to resolve O'(X',Y'): on screen ruler method, which displays ruler directly on screen and use it to measure TV screen coordinate system (x-y system) coordinates X1', X2', Y1', Y2' in picture. The scales on the rulers represent TV screen coordinate directly and accurately. On screen rulers in this method comprise scales and numbers (or letters).

The purpose of this method to reduce the calculation complex of the algorithm described in FIG. 2B. The on screen ruler method displays a ruler on 4 edges of the screen (200). Rulers could be displayed on screen all the time from game start to game over, or display only in the moment when use trigger (12) to capture picture with the camera (13). An alternative implementation is glue rulers on frame of the display (20), outside of the screen (200). Rulers on 4 edges of the display (200) have the same scale.

The software in embedded computer (14) is invoked when a picture is captured by camera (13). The procedure to find O'(X', Y') in the TV screen coordinate system (x-y system) is listed below, which is based on the algorithm of Equalized Ratio described in FIG. 2B:

1. Scan the picture to locate the coordinates of 4 corners of the quadrilateral (110) S(xs, ys), T(xt, yt), U(xu, yu), V(xv, yv) in picture coordinate system (100), and get estimated angles α and β as described in FIG. 2B.

2. Find the coordinates of C(xc, yc) and D(xd, yd) in picture coordinate system (100) with angle β, as described in FIG. 2B, and find the coordinates of A(xa, ya) and B(xb, yb) with angle α in the same way to find C(xc, yc) and D(xd, yd).

3. The software will use Optical Character Recognition (OCR) to recognize the 2 ruler numbers (or letters) nearest to the position A(xa, ya) in picture coordinate system (100) and then use the scales between the 2 numbers to find the X1', which is a coordinate in TV screen coordinate system (x-y system). Similarly, read the ruler to get X2' at position B(xb, yb), Y1' at the position C(xc, yc), and Y2 at the position D(xd, yd).

4. The software will check whether X1'=X2' and Y1'=Y2', if not equal, the software will adjust angles α and β and go through the steps 2 to 4 above until X1'=X2' and Y1'=Y2'.

5. The final result is X'=X1'=X2' and Y'=Y1'=Y2', and O'(X', Y') is the coordinate of hit point (25) in TV screen coordinate system (x-y system).

For example, go through the above steps 1 and 2 to find A(xa, ya), B(xb,yb), C(xc,yc), D(xd,yd) in picture coordinate system (100), and then continue with step 3 and 4: the 2 ruler numbers nearest to the position A(xa, ya) in FIG. 2C is 115 and 120. The software uses OCR to recognize them and then use ruler scale between 115 and 120 to get the coordinate X1' in TV screen coordinate system (x-y system), which is X1'=118. Similarly, X2' at the position B(xb, yb) is X2'=118, X1'=X2', therefore, X'=118. The coordinate Y' is located with the same way, which is Y1'=112 at position C(xc, yc) and Y2'=112 at position D(xd, yd), and Y1'=Y2', therefore, Y'=112. The hit point coordinate in this example is O'(X', Y')=(118, 112). The embedded computer (14) will send the coordinate (118, 112) to the game computer (21) via wireless communication and let it determine if the target (26) is hit or not.

This method requires game player to hold game controller (10) still, without shaking in the moment to shot the picture or the picture will be blurred and the software is hard to recognize ruler numbers (or letters) and scales.

FIG. 3A is another embodiment of screen coding methods: one dimensional (1D) screen coding method, which has similar concept to on screen ruler method described in FIG. 2C. This method uses coding block to represent TV screen coordinate directly. This 1D screen coding method has certain tolerance to game controller shaking in the moment of picture shot, as well as to improve the processing speed, because the coding block recognition is much easier then OCR used in FIG. 2C. This method displays screen coding blocks directly on 4 edges of the screen (200). Screen coding blocks could be displayed on screen all the time from game start to game over, or only in the moment to capture picture with the camera (13). An alternative way of implementation is glue screen code on frame of the display (20), outside of the screen (200). (201) is a description to the up-left corner of the screen (200), inside which 210a, 211, 212 and their relationship are described in detail.

211 is horizontal block bar to organize coding block, which defines X coordinate axis in TV screen coordinate system (x-y system). The size of a coding block on (211) is n×m pixels (n<m, such as 10×20). The block bar (211) is displayed on the top and bottom edge of the screen (200).

212 is vertical block bar to organize coding block, which defines Y coordinate axis in TV screen coordinate system (x-y system). The size of a coding block on (212) is m×n pixels (m>n, such as 20×10). The block bar (212) is displayed on the left and right edge of the screen (200).

210a, 210b, 210c, 210d are corner blocks, which is used to mark four corners on screen (200). Each corner block is identified with single or multiple colors or bar code. The size of a corner block is m×m pixels.

A coding block on block bar (211, 212) is also identified with single or multiple colors or bar code. One embodiment to identify a coding block with colors is described in FIG. 3B in detail.

In one embodiment of this method, coding blocks are arranged in a series that each pair of neighbored coding blocks in a series is unique, and each block bar (211, 212) contains one or more such series. A pair of neighbored coding blocks is defined as a block at position N with its immediate neighbored block at position N−1 or N+1; or with its other neighbor blocks at position N−n or N+n, where n=2, 3, . . . therefore, a pair of neighbored coding blocks is defined as 2 blocks at position (N−1, N), (N, N+1), or (N−2, N), (N, N+2), . . . . The property of uniqueness of each paired coding block decides that each code block pair has one and only one position in the series; therefore, software in embedded computer (14) could easily locate a coding block pair position in a series by recognizing the pattern of a coding blocks pair.

In other embodiment of this method, coding blocks could be arranged in a series that each combination of three or more coding blocks in a series is unique. A combination of coding blocks is defined as block N with its two neighbors, such as (N−1, N, N+1). The property of uniqueness of each combined coding blocks decides that each code block combination has one and only one position in the series.

FIG. 3B is a table to define a coding block with different colors. In this embodiment, each coding block is defined with two colors from a set of five total colors. There are $5^2=25$ kinds of coding blocks in total. The number of possible permutations of 2 coding block from a set of 25 is $$P(25,2)=25 \times 24=600$$

It means that there exists a series with 600 coding block in which each pair of neighbored coding block is unique. A 600 coding block series is long enough for a 1080p TV (1920×1080 pixels), even long enough for a 4K TV (3840× 2160 pixels), if a coding block size is 10×20 pixels in the horizontal coding block bar (211), and 20×10 pixels in the vertical coding block bar (212). Note that each block bar (211, 212) could have one or more such series FIG. 3C is a description of how to use the one dimensional coding method to determine coordinate O'(X', Y') in TV screen coordinate system (x-y system). The procedure to determine O'(X', Y') is listed below, which is similar to the procedure described in FIG. 2C, except the step 3.

1. Scan the picture to locate the coordinates of four corners of the quadrilateral S(xs, ys), T(xt, yt), U(xu, yu), V(xv, yv) in the picture coordinate system (100), and estimated angles α and β as described in FIG. 2B.

2. Find the coordinates of C(xc, yc) and D(xd, yd) in picture coordinate system (100) with angle β, as described in FIG. 2B, and find the coordinates of A(xa, ya) and B(xb, yb) with angle α in the same way to find C(xc, yc) and D(xd, yd).

3. The software will find the coding bock N at position A(xa, ya) in picture coordinate system (100) and its immediate neighbored blocks N−1 or N+1. The software could locate the position of coding block pair (N−1, N) or (N, N+1) in the series by analysis their pattern, and decide block N location in the series, and further decide the coordinate X1' in TV screen coordinate system (x-y system). Similarly, analysis the block pair pattern to get X2' at position B(xb, yb), Y1' at the position C(xc, yc), and Y2 at the position D(xd, yd).

4. The software will check whether X1'=X2' and Y1'=Y2', if not equal, the software will adjust angles α and β and go through the above step 2 to 4 until X1'=X2' and Y1'=Y2'. 5. The final result O'(X', Y')=O'(X1', Y1'), which is the coordinate of hit point (25) in TV screen coordinate system (x-y system).

In one embodiment of implementation, the coordinates X' in TV screen coordinate system (x-y system) is defined in the middle of a coding bock N in position A(xa, ya). Therefore, the biggest error of X' is half of a coding block size, the same is for Y'. For example, the biggest error for X' is 5 pixels if a coding block size is 10×20 pixels on horizontal coding block bar (211), the biggest error for Y' is 5 pixels on vertical coding block bar (212), too.

Figure 4A:
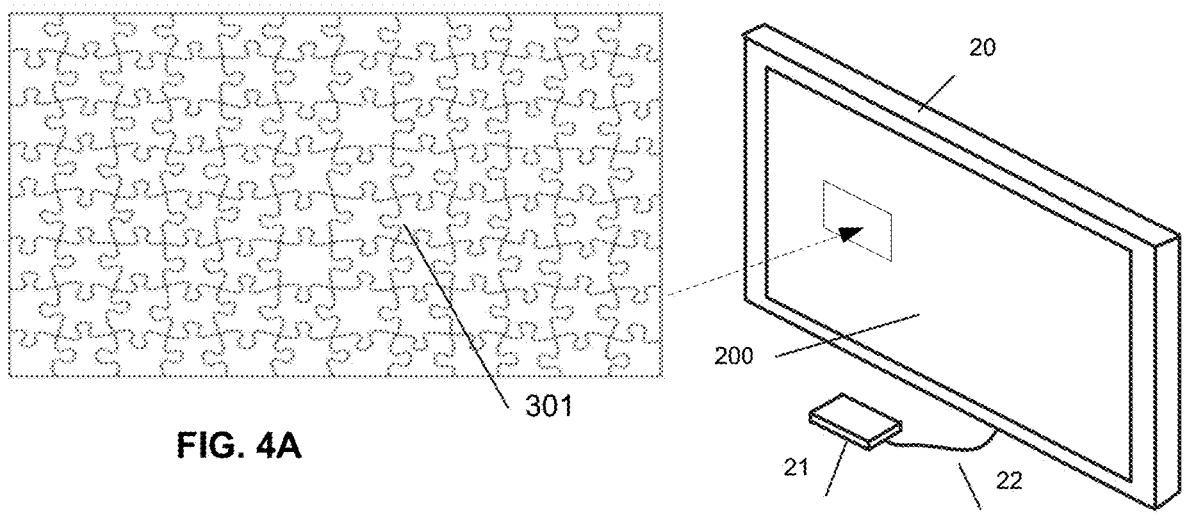
FIG. 4A is yet another embodiment of screen coding methods: two dimensional coding method

FIG. 4A is another embodiment of screen coding methods, two dimensional (2D) screen coding method, which is good for curved TV screen or huge sized display screens, such as a display wall, where a picture could only cover a part of a screen, without all screen edge or corner is in a picture.

This coding method is a straightforward way to located the O'(X', Y') without mathematical calculation required, which displays small 2D coding blocks on screen (200) as a background. Each 2D coding block in a screen area is identified by puzzle line, or bar code, or any other methods in order to make each coding block unique. The uniqueness of each 2D coding block decides it has one and only one position in a screen area (301), therefore, the position of each 2D coding block could be determined by reorganizing its pattern. 2D coding blocks are organized in a screen area (301) and a TV screen (200) could have one or more such screen area (301). Puzzle lines for identifying coding block could be any color, and any line weight, as long as it is appropriate as screen background. 2D coding blocks could be displayed on screen all the time from game start to game over, or only in the moment when use trigger (12) to capture picture with the camera (13).

(301) is an embodiment of a screen area filled with 2D coding blocks. Each puzzle piece is a unique 2D coding block, identified by puzzle line.

Image stabilization technology in modern camera is necessary to prevent blurry photo and better recognize a 2D coding block.

Figure 4B:
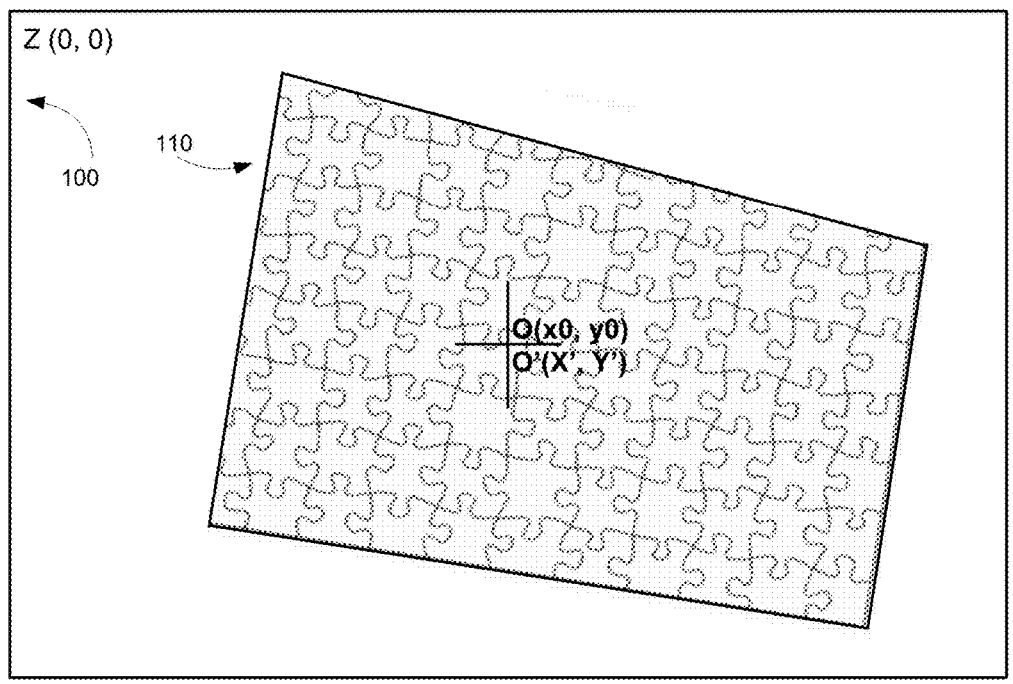
FIG. 4B is a description of use 2D coding method to find the coordinates of hit point on screen.

FIG. 4B describe how to use 2D coding blocks to get the coordinate O'(X', Y') in TV screen coordinate system (x-y system) with the following 3 steps:

1) Locate a 2D coding block at picture center O(x0, y0), which is marked by reticle (101). The point O(x0, y0) is the coordinate in picture coordinate system (100).

2) Find the position of this 2D coding block on TV screen (200) by reorganize this 2D coding block's puzzle shape because each 2D coding block is unique in a screen area (301). Each 2D block has one and only one position in a screen area (301), and its center coordinate in TV screen coordinate system (x-y system) is known.

3) The 2D block center's coordinate O'(X', Y') in TV screen coordinate system (x-y system) could be found when the block is identified. A 2D coding block is further divided into smaller sub piece, such as 3×3 or 5×5 (See FIG. 4C). The coordinate O'(X', Y') is defined as the center of a sub piece in which the reticle (101) is pointing to.

Figure 4C:
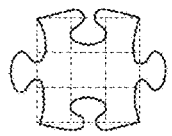
FIG. 4C is a description of an embodiment to improve two dimensional coding method accuracy by dividing a 2D coding block into 3×3 sub pieces.

FIG. 4C is an embodiment of dividing a 2D coding block into 3×3 sub piece to improve the accuracy of O'(X', Y'), as described in FIG. 4B.

FIG. 5A is flowcharts to find the hit point coordinate O'(X', Y') in TV screen coordinate system (x-y system) using the algorithm described in FIG. 2B. Box (801) said select an angle β for calculating slop of line CD, and select an angle α for calculating slop of line AB. Box (802) said calculate C(xc, yc), D(xd, yd) in picture coordinate system (100), and calculate A(xa, xb), B(xb, yb) with the same way. Box (803) said calculates q1, q2, Qmax1, Qmax1, and calculate p1, p2, Pmax1, Pmax2 with the same way. Box (804) check whether $$\frac{q1}{Qmax1} = \frac{q2}{Qmax2} \text{ and } \frac{p1}{Pmax1} = \frac{p2}{Pmax2}.$$

If the ratios are not equal, adjust angles α, β and repeat box (801), (802), (803), (804), until get equalized ratios. Box (805) said calculate Y', X' with equation 18, 19 described in FIG. 2B. The rest of boxes are self-described.

FIG. 5B is flowcharts to find the hit point coordinate O'(X', Y') in TV screen coordinate system (x-y system) using on screen ruler method described in FIG. 2C. The box (810) is for handling 2 different ways of on screen ruler display: either display all the time from game start to game over, or only displayed in the moment of trigger camera to take picture. Boxes (801, 802) are described in FIG. 5A. Box (811) said use Optical Character Recognition (OCR) to recognize the 2 nearest numbers around the position A(xa, ya); and find 2 numbers in the same way for each B(xb, yb), C(xc, yc), D(xd, yd) respectively in picture coordinate system (100) and recognize ruler scales to get X1', X2', Y1', Y2'. Box (812) check whether X1'=X2' and Y1'=Y2', if not, adjust angles α, β and repeat box (801), (802), (811), (812), until X1'=X2' and Y1'=Y2'. Box (813) is simply get O'(X', Y') with X'=X1' and Y'=Y1'. The rest of boxes are self-described.

FIG. 5C is flowcharts to find the hit point coordinate O'(X', Y') in TV screen coordinate system (x-y system) using dimensional screen coding method described in FIG. 3A, 3B, 3C. The box (810) is described in FIG. 5B. Box (801, 802) are described in FIG. 5A. Box (821) said recognize the coding block pair at the position A(xa, ya), B(xb, yb), C(xc, yc), D(xd, yd) in picture coordinate system (100) and get X1', X2', Y1', Y2', as described in FIG. 3C. Box (812) check whether X1'=X2' and Y1'=Y2', if not, adjust angles α, β and repeat box (801), (802), (821), (812), until X1'=X2' and Y1'=Y2'. Box (813) is simply get O'(X',Y') with X'=X1' and Y'=Y1'. The rest of boxes are self-described.

FIG. 5D is flowcharts to find the hit point coordinate O'(X', Y') in TV screen coordinate system (x-y system) use two dimensional screen coding, described in FIG. 4A, 4B, 4C. All boxes are self-described. The box (810) is described in FIG. 5B. Box (830) said get the 2D coding block at the position O(x0, y0) in picture coordinate system (100). Box (831) said the position of 2D block in TV screen coordinate system (x-y system) could be located by recognize its puzzle pattern. Box (832) said the hit point coordinate O'(X', Y') in TV screen coordinate system (x-y system) is defined in the middle of a sub piece of the 2D coding block, as described in FIG. 4B, 4C. The rest of boxes are self-described.

FIG. 6A is right side view of an embodiment of game controller (10), which comprises an optical sight (11), a trigger (12), a compact camera with or without any kind of image stabilization (13), an embedded computer (14), an operation panel (18), wireless communication, motion sensor, battery, LED light, an audio, and a vibrator, etc. The game controller is gun shaped, but it has no gun barrel to emit light beam or shoot any kind of physical projectile, it only capture picture, therefore, it is safe to use. Variety of modern smart phones could be used as embedded computer (14), because new generation smart phones in market, such as iPhone, Android phones or Windows phones, are powerful enough to control a separated camera, calculate O'(X', Y') and communicate with game computer. Another embodiment of game controller (10) using smart phone directly for camera (13), embedded computer (14), and control panel (18) will be described in FIG. 9A, 9B 10A, 10B, 11A, 11B, 12A, 12B. The image quality is important to calculate O'(X',Y'), therefore, game controller is designed to detect movement or shaking using motion sensor, or any other method in the moment of picture capture, and the game controller will stop capture a picture if a big movement or shaking is detected. In other words, the camera only takes picture when the game controller has an acceptable movement or shaking.

The optical sight (11) is made up of an eyepiece (15), a translucent mirror (16), and a flat or curved lens (17). In operation, the light passes through the lens (17), and strike the translucent mirror (16), which let certain amount light passes directly through to eyepiece (15), while the rest of light is reflected to the camera (13). In this embodiment, the direction of translucent mirror (16) is face down with an angle φ. Typical φ=45°, but could be adjusted between 5°<φ<85° as needed.

FIG. 6B is the rear view of an embodiment of game controller (10), as described in FIG. 6A, where we could see that the control panel (18) has some control and navigate buttons for game player to start, stop a game, set menus, select games, etc. All button clicks will send to game computer (21) via wireless communication. FIG. 6B also shows the eyepiece (15) for game player to aim at target (26) through it.

Figure 7:
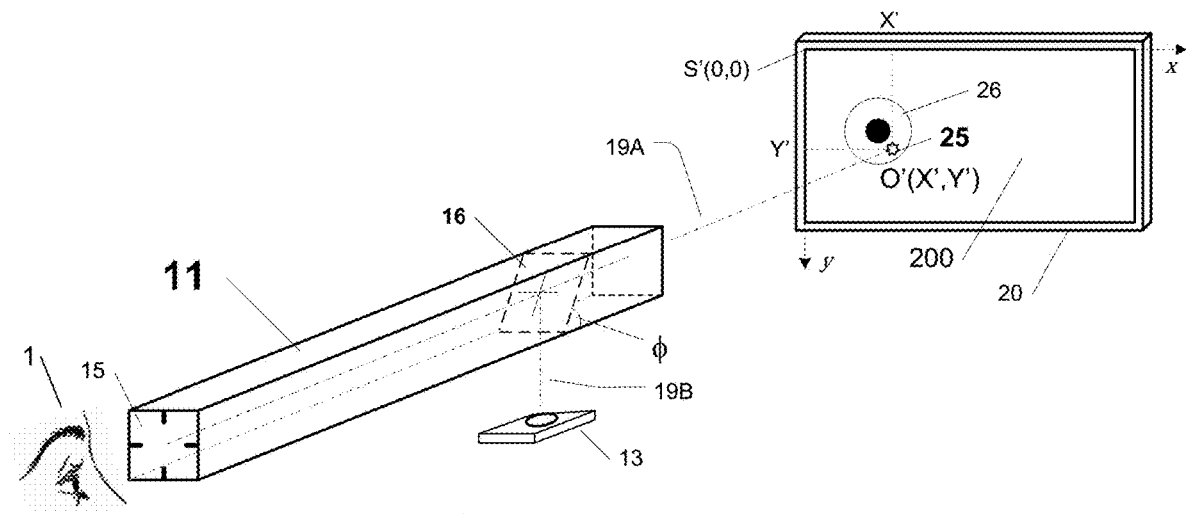
FIG. 7 is a perspective view of the optical sight and its design

FIG. 7 is a perspective view of an embodiment of the optical sight (11), where (15) is the eyepiece with a set of mark printed on it, (16) is the translucent mirror with a reticle printed on its center, and (17) is a flat or curved lens. Light passes through the lens (17), and strike the translucent mirror (16), which let certain amount of light passes directly through to eyepiece (15), and the rest of light is reflected to the camera (13). The reticle could be seen on the eyepiece, but it is not displayed on TV screen (200). (19A) is the central axis of the optical sight (11), which passes through the reticle on center of the translucent mirror (16) from the center of eyepiece (15), and is pointing to a point on TV screen (200), known as hit point (25), whose coordinate in TV screen coordinate system (x-y system) is O'(X', Y'). (19B) is the camera (13) optical center's central axis, which is perpendicular to (19A) on the center of translucent mirror (16). In this design, the reticle along with the hit point (25) will be projected to the picture center by means of the translucent mirror (16). A set of mark printed on the eyepiece (15) is to help game player (1) to prevent parallax by put eye on the central axis (19A) while aiming at target (26). In this embodiment, the direction of translucent mirror (16) is face down with an angle φ. Typical φ=45°, but could be adjusted between 5<φ<85 as needed. Camera could be place in any other side of the optical sight with the translucent mirror face to correspond direction with an angle φ. Typical φ=45°, but could be adjusted between 5<φ<85 as needed. In this embodiment, a smart phone could be used for the camera.

Figure 7A:
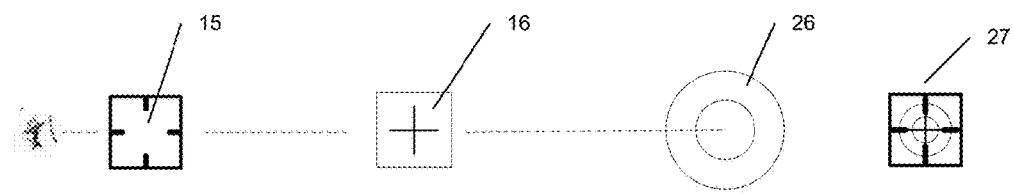
FIG. 7A describe the correct usage of the optical sight without parallax

FIG. 7A indicates a game player (1) correctly puts eye on the central axis (19A) to aim at the target (26) through eyepiece (15) and reticle on translucent mirror (16) without parallax. (27) is a view the game player (1) seen on eyepiece (15), where the reticle on translucent mirror (16), and the eyepiece (15) are concentric, and is pointing to hit point (25) correctly. In this situation, a point on screen (200) a game player seen on eyepiece is what he/she get in picture center, that is, hit point (25) coordinate O'(X',Y') in x-y system is projected to the picture center O(x0, y0) in picture coordinate system (100).

Figure 7B:
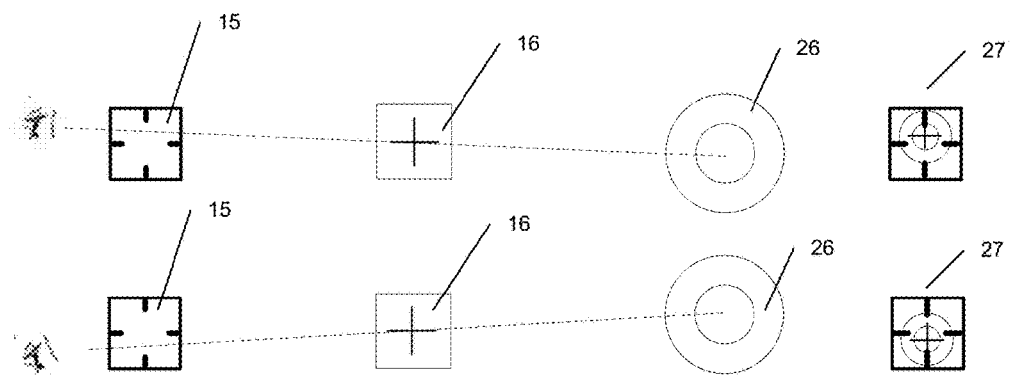
FIG. 7B describe possible parallax with use of the optical sight incorrectly

FIG. 7B describes parallax happens when game player's eye is off the central axis (19A), and a possible view (27) a game player could see on eyepiece (15).

Figure 8A:
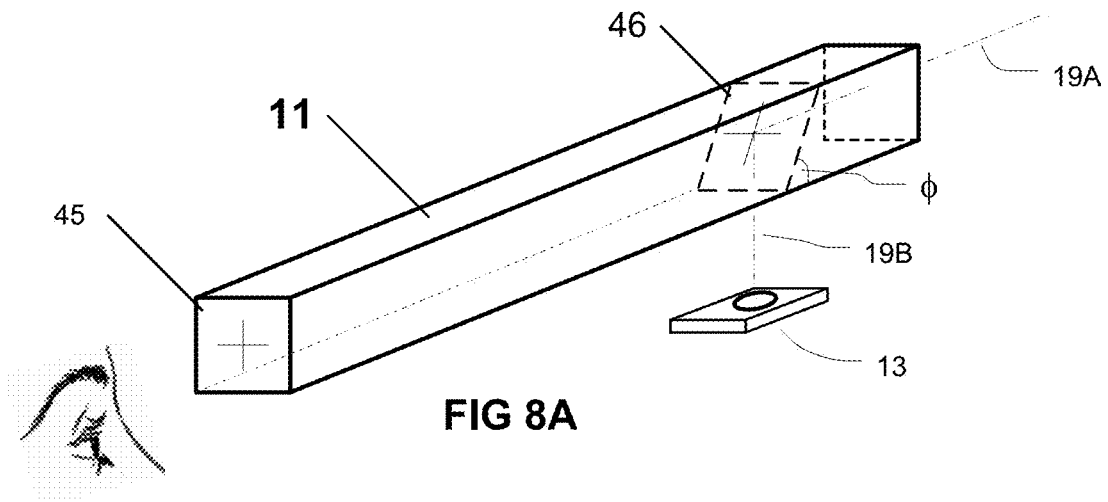
FIG. 8A is an embodiment of an electronic sight design
Figure 8B:
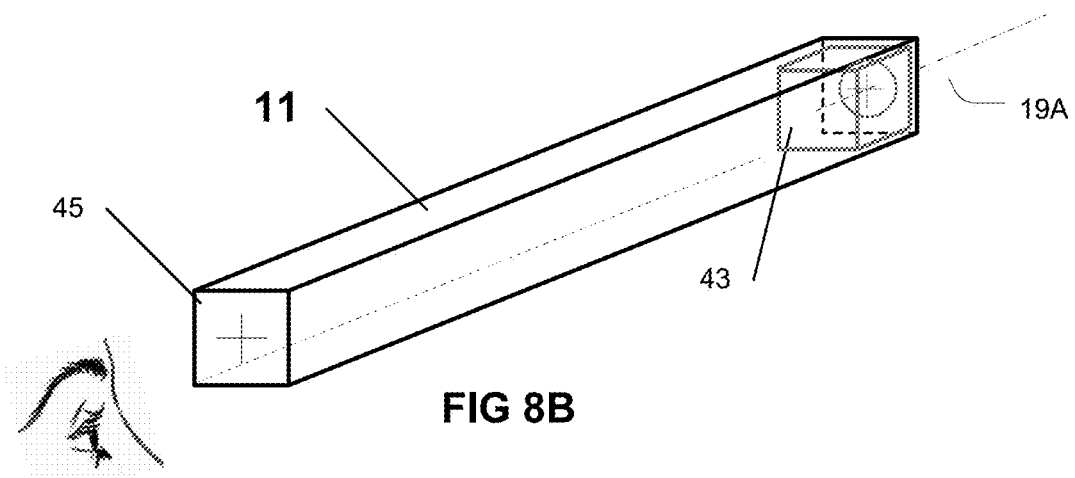
FIG. 8B is another embodiment of an electronic sight design

FIG. 8A is a perspective view of an embodiment of an electronic sight (11), where (45) is an electronic eyepiece (screen), and (46) is a mirror, which reflects all light to the camera (13). The direction of mirror (46) is face down with an ϕ. Typical ϕ=45°, but could be adjusted between 5°<ϕ<85° as needed. Images in camera (13) are displayed continuously onto the electronic eyepiece (45) in real time to assist game player aiming at the target. (19A) is the central axis of the electronic sight (11) which is go through center of the mirror (46) and point to hit point (25) on screen (200). (19B) is the camera (13) optical center's central axis, which is perpendicular to (19A) at center of the mirror (46). In this design, a reticle printed on center of the mirror (46) along with the hit point (25) will be projected to the picture center by means of the mirror (46). The electronic sight (11) is easier to use than optical sight (11) described in FIG. 7, because it is parallax free even through game player's eye is off the central axis (19A). This design is WYSIWYG, means what a game player (1) seen on electronic eyepiece is what he/she get in picture with this embodiment of an electronic sight (11), because images in camera (13) are continuously displayed onto the electronic eyepiece (45) in real time. Camera could be place in any other side of the electronic sight with the mirror face to correspond direction with an angle ϕ. Typical ϕ=45°, but could be adjusted between 5<ϕ<85 as needed. In this embodiment, a smart phone could be used for the camera FIG. 8B is a perspective view of another embodiment of an electronic sight (11), where (45) is an electronic eyepiece (screen), and (43) is a camera embedded inside the sight (11). In this design, images in the camera (43) are continuously displayed onto the electronic eyepiece (45) in real time to assist game player aiming at the target on screen (200). A reticle is printed on the lens center, which will be captured into the picture as its center, and be projected onto the electronic eyepiece (45) as the screen center too. The projected image on electronic eyepiece (45) is concentric to its original picture captured by the camera (43). (19A) is the central axis of the electronic sight (11) which is go through the optical center of camera (43) and point to hit point (25) on screen (200). The reticle along with the hit point (25) on screen (200) is projected to picture center when it is captured into the picture. The electronic sight is easier to use than optical sight described in FIG. 7, because it is parallax free even through game player's eye is off the central axis (19A). This design is WYSIWYG, means what a game player (1) seen on electronic eyepiece is what he/she get in picture with this embodiment of an electronic sight (11).

Figure 9A:
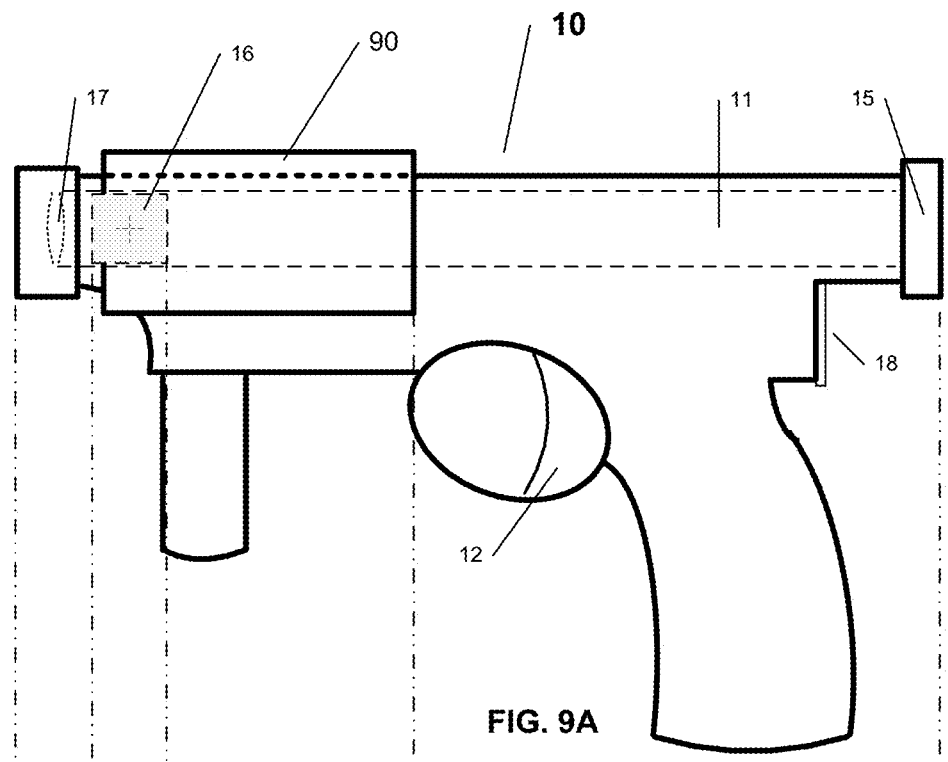
FIG. 9A is the left side view of an embodiment of game controller using smart phone for its camera, control panel and embedded computer
Figure 9B:
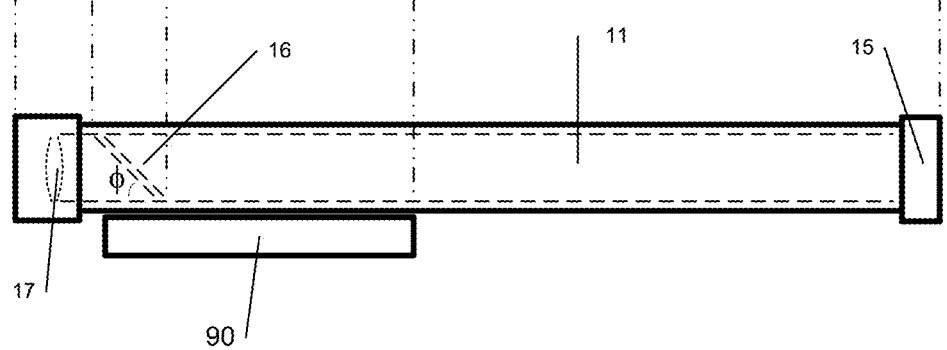
FIG. 9B is the top view of the FIG. 9A

FIGS. 9A and 9B is an embodiment of a game controller (10) with use variety of smart phones directly for its camera, embedded computer and control penal. The camera and computer are more and more powerful in modern smart phones, and it's possible to replace camera (13) and embedded computer (14) in a game controller (10), as described in FIG. 6A.

FIG. 9A is the left side view of the game controller (10). (90) is an adapter to hold and attach a smart phone to game controller (10). The detailed design of the adapter (90) is described in FIG. 10A, 10B. All components (11), (12), (15), (16), (17) (18) are the same as described in FIG. 6A, 6B, and FIG. 7.

FIG. 9B is the top view of the game controller (10). (16) is a translucent mirror, whose direction is face left with an ϕ. Typical ϕ=45°, but could be adjusted between 5°<ϕ<85° as needed. The optical sight (11) with the face left translucent mirror has the same design and functionality as described in FIG. 7.

In this embodiment of a game controller (10), a game player to start a game on the smart phone, and aims at an on screen target (26) with the optical sight (11), and then use trigger (12) to "shoot" it, which will result in triggering a smart phone APP to use the phone camera to capture a picture of screen. The smart phone APP then analysis the image in picture and calculates the coordinates of hitting point on screen with the same methods as described from FIG. 2A through FIG. 5D, and sends the coordinate of hit point to the game computer (21) with wireless communication, such as WIFI or blue tooth.

Figure 10A:
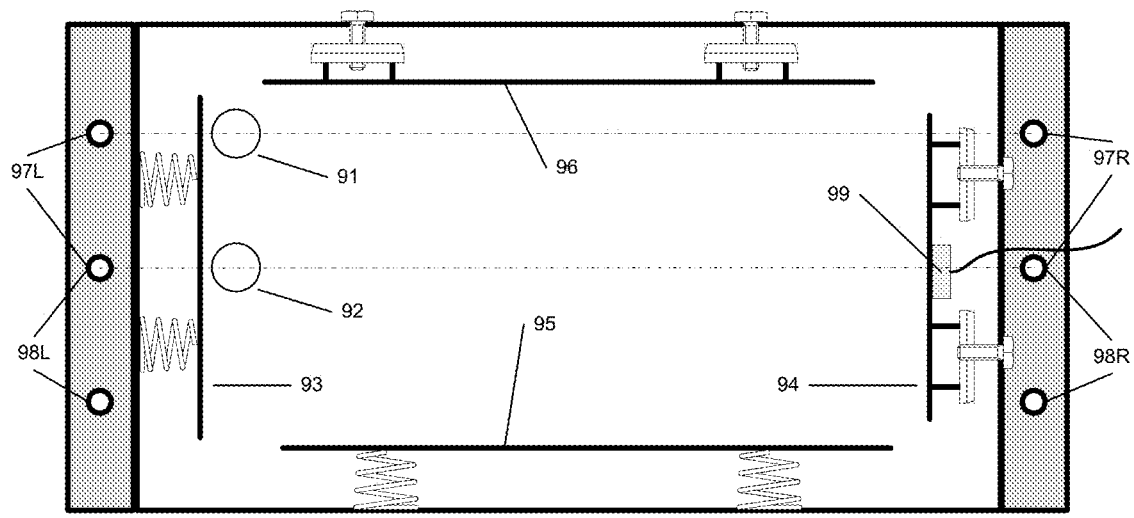
FIG. 10A is the front view of an embodiment of a smart phone adapter

FIG. 10A is the front view of an embodiment of a smart phone adapter (90). The purpose of the adapter (90) is to hold variety of smart phones, such as iPhones, android phones, windows phones, etc. and attach it to game controller (10). The adapter (90) is designed to hold a smart phone with either side-located camera, such as iPhone or middle-located camera, such as Samsung Galaxy. (91) is a lens hole for smart phone with side-located camera. (92) is a lens hole for smart phone with middle-located camera. In this embodiment, (91) and (92) are for smart phones with single lens, such as iPhone 6. The lens hole could be expended for smart phones with multiple lenses, such as iPhone 7+, as needed.

(93) is a horizontal spring regulator, and (94) is a horizontal bolt regulator. (93) and (94) work together to adjust a smart phone's horizontal position. (95) is a vertical spring regulator, and (96) is a vertical bolt regulator. (95) and (96) work together to adjust a smart phone's vertical position. The purpose of vertical and horizontal regulators is to adjust a smart phone into a concentric position so that its camera lens center is at the center of a lens hole (91) or (92).

(97L) is the left side mount point and (97R) is the right side mount point of the adapter (90), which is designed to mount smart phones with side-located camera, such as iPhone. The lens hole (91) is concentric to the center of translucent mirror (16) when the adapter (90) is mounted with (97L) and (97R).

(98L) is the left side mount point and (98R) is the right side mount point of the adapter (90), which is designed to mount smart phones with middle-located camera, such as Samsung Galaxy. The lens hole (92) is concentric to the center of translucent mirror (16) when the adapter (90) is mounted with (98L) and (98R).

(99) is a connector and cable to connect a smart phone to the game controller (10), so that smart phone could input the motion sensor signal and trig signal from trigger (12), and output control signal to control LED light, audio, and vibration in game controller (10). It could also provide smart phone extra power from game controller's battery.

Figure 10B:
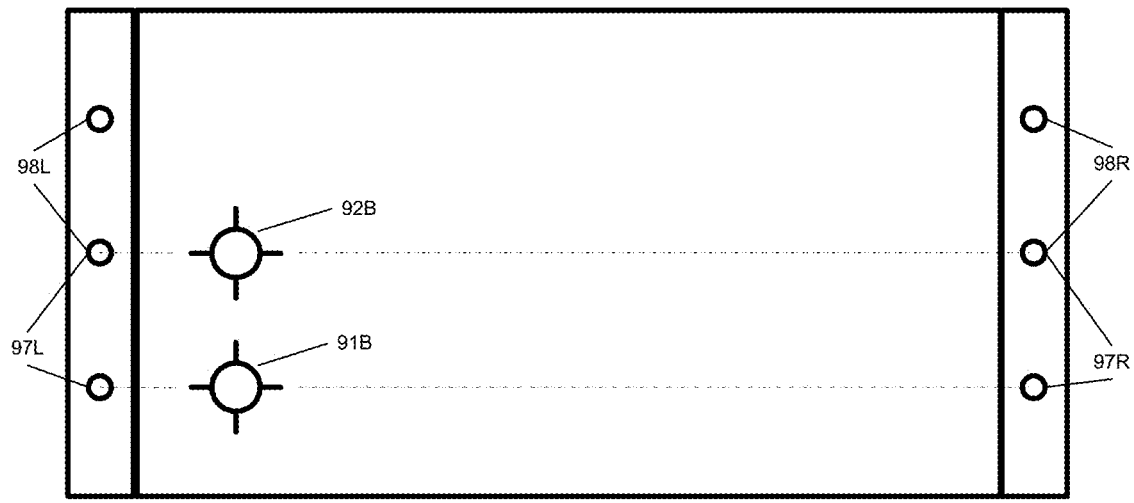
FIG. 10B is the back view of FIG. 10A

FIG. 10B is the back view of the adapter (90) described in FIG. 10A. (91B) and (92B) are lens holes seen from back view of the adapter (90). The reticle printed with (91B) and (92B) are to help users adjust smart phone camera into the concentric position to the lens hole (91) or (92).

Figure 11A:
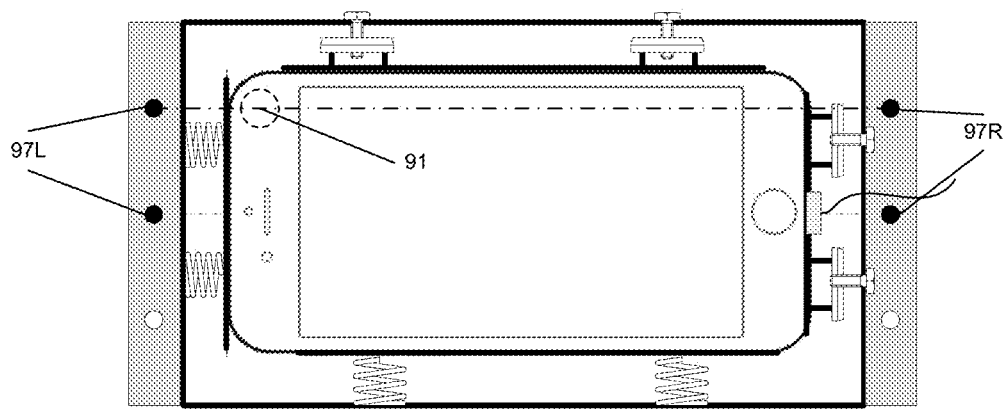
FIG. 11A is using the smart phone adapter to hold an iPhone
Figure 11B:
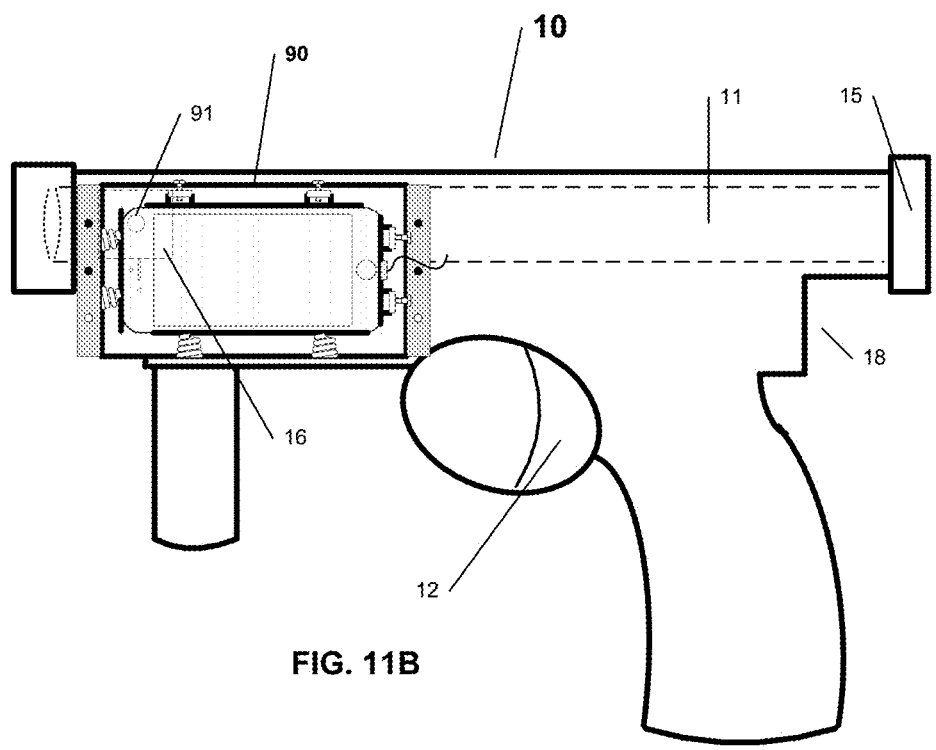
FIG. 11B is install an iPhone to game controller with smart phone adapter

FIGS. 11A and 11B are an embodiment of using the adapter (90) to hold a phone with side-located camera, such as iPhone and mount it to the game controller (10) with mount point (97L, 97R).

Figure 12A:
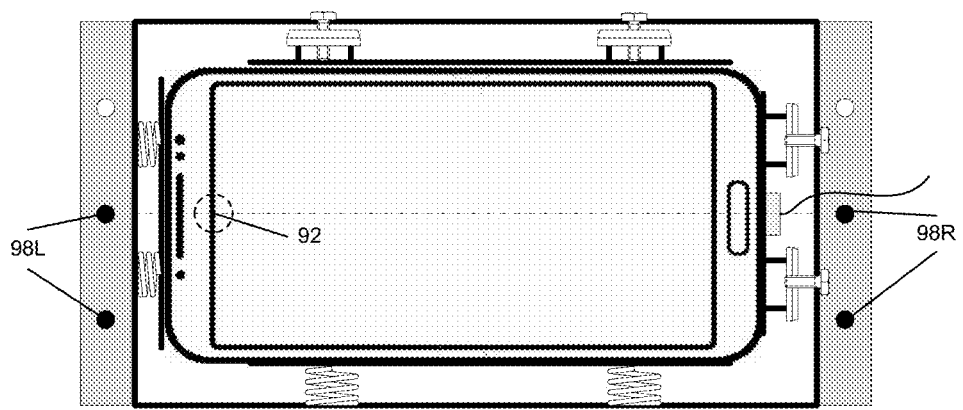
FIG. 12A is using the smart phone adapter to hold a Samsung Galaxy phone
Figure 12B:
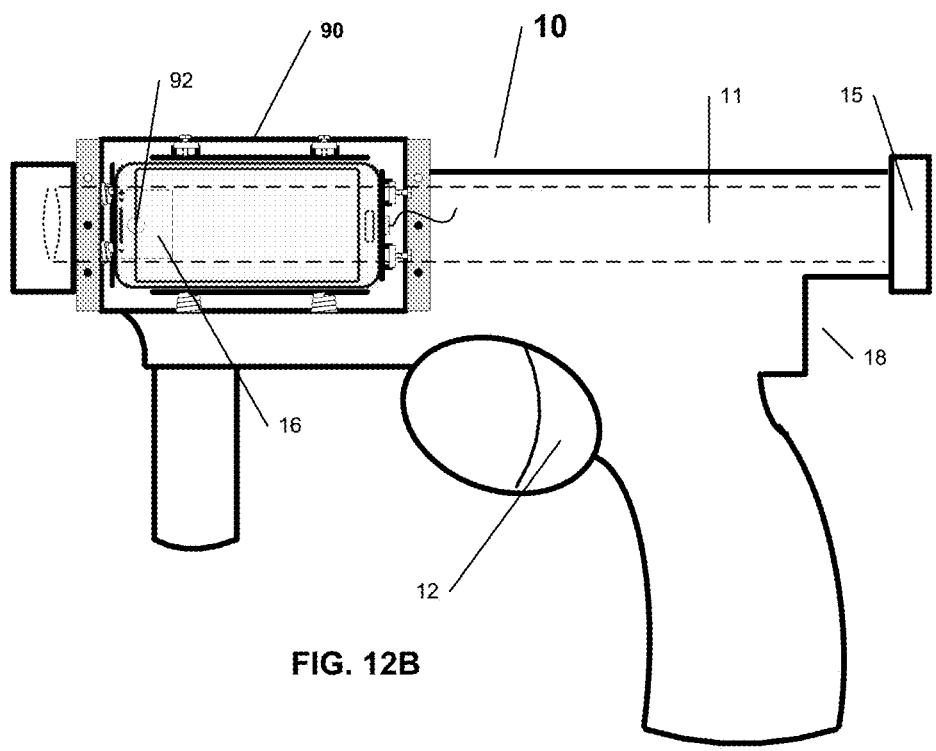
FIG. 12B is install a Samsung Galaxy phone to game controller with smart phone adapter

FIGS. 12A and 12B are an embodiment of using the adapter (90) to hold a phone with middle-located camera, such as Samsung Galaxy and mount it to the game controller (10) with mount point (98L, 98R).

Although the description has been particularly shown and described with reference to multiple embodiments, it will be understood by persons skilled in the relevant art that various changes in form and details can made therein without departing from the spirit and scope of the specification.

The invention claimed is:

1. A method of using a camera based game controller to determine coordinates O'(X', Y') of a hit point on a TV screen, said method comprising:
   using the camera based game controller comprising a sight, camera, and an embedded computer to project a central axis of said sight at a screen target on said TV screen, thereby aiming at said hit point on said TV screen with coordinates O'(X', Y') and trigger capturing of TV screen pictures;
   using said camera, said embedded computer, said captured TV screen pictures, and an equalized ratio algorithm to calculate said coordinates O'(X', Y') of said hit point on said TV screen;
   wherein said method further comprises:
   a) using an on screen ruler comprising scales and any of numbers or letters to identify and measure screen coordinates directly, and using said equalized ratio algorithm and OCR to determine said coordinates O'(X', Y') of said hit point on said TV screen;
   b) using a one dimensional screen coding method wherein a first uniqueness of each combination of two or more neighbored coding blocks, and said equalized ratio algorithm, are used to determine said coordinates O'(X', Y') of said hit point on said TV screen; and
   c) using a two dimensional screen coding method wherein a second uniqueness of each 2D coding block in a screen area is used to determine said coordinates O'(X', Y') of said hit point on said TV screen.

2. The method of claim 1, wherein said camera based game controller comprises any of:
   a) an optical sight comprising a translucent mirror configured to project said hit point coordinates O'(X', Y') on said TV screen to picture center coordinates O(x0, y0);
   b) an electrical sight configured to project said hit point coordinates O'(X', Y') on said TV screen to the picture center coordinates O(x0, y0);
   c) a motion sensor configured to detect any motion and/or shaking of said camera based game controller;
   d) a smart phone adapter configured to hold a smart phone, and to use a smart phone as said camera, and said embedded computer, and to provide a control panel for said camera based game controller.

3. The method of claim 2, wherein said camera based game controller further comprises any of a trigger, an operation panel, the motion sensor, wireless communication device, battery, LED light, an audio output, and a vibrator.

4. The method of claim 2, wherein said camera based game controller further comprises the smart phone and wherein said embedded computer is a smartphone embedded computer.

5. The method of claim 2, said camera based game controller is configured to use said motion sensor to stop said capturing of TV screen pictures if said motion sensor detects motion or shaking.

6. The method of claim 2, wherein said optical sight comprises a transparent eyepiece with a set of marks printed on it, a translucent mirror with a reticle printed on its center, and a lens;
   wherein a said camera is located on a bottom side of said optical sight and said translucent mirror is oriented face down with an angle Φ;
   said camera is placed on any other side of said optical sight and the Φ is between 5° and <85°; and
   wherein said camera based game controller comprises any of either:
   a) the smart phone, and said camera comprises a smart phone camera, and
   b) a video camera.

7. The method of claim 2, wherein said electrical sight comprises an electronic eyepiece, a mirror with a reticle printed on its center to reflect light to the camera, and a flat or curved lens;
   wherein said camera is located on a bottom side of said sight and said mirror is oriented face down with an angle Φ;
   said camera is placed on any other side of said electrical sight and the Φ is between 5° and <85°;
   wherein said camera captures images that are displayed continuously onto said electronic eyepiece in real time; and
   wherein said camera based game controller comprises any of either
   a) the smart phone, and said camera comprises a smart phone camera, and
   b) a video camera.

8. The method of claim 2, wherein said electrical sight comprises an electronic eyepiece, a flat or curved lens with a reticle printed on its center and the camera embedded inside said sight; and
   wherein said camera captures images that are projected continuously onto said electronic eyepiece in real time.

9. The method of claim 8, wherein said electronic sight comprises the smart phone.

10. The method of claim 2, wherein said camera based game controller comprises the smart phone, and said camera, control panel, and embedded computer comprises a smartphone's camera, control panel, and embedded computer;
    wherein said camera based game controller further comprises the adapter to hold the smart phone, any of the optical sight and the electrical sight, a trigger, the motion sensor, wireless communication device, battery, LED light, an audio device, and a vibrator device;
    wherein said camera based game controller further comprises the smart phone adapter configured to place said smart phone on any side of said camera based game controller.

11. The method of claim 10, in which said smart phone adapter comprises a lens hole configured for smart phones with any of side-located cameras, middle-located cameras, single lens cameras or multiple lens cameras;
    said smart phone adapter further comprises any of a vertical and horizontal spring regulator and vertical and horizontal bolt regulator configured to adjust the smart phone into a concentric position so that its camera lens center is at a center of a said lens hole;
    said smart phone adapter further comprising a left side mount point and a right side mount point configured to mount said smart phone on to said game controller;
    said smart phone adapter further comprising a cable configured to connect said smart phone to said game controller for any of input, output and power supply.

12. The method of claim 1, wherein said on screen ruler is either glued on a frame of said TV screen or displayed on four edges of said TV screen at least during said trigger capturing of TV screen pictures.

13. The method of claim 1, wherein said two or more neighbored coding blocks are either glued on a frame of said TV screen or displayed on four edges of said TV screen at least during said trigger capturing of TV screen pictures.

14. The method of claim 1, wherein said one dimensional screen coding method uses corner blocks to mark four corners of said TV screen, and each said corner block is identified with any of single or multiple colors, or a bar code.

15. The method of claim 1, wherein said one dimensional screen coding method uses additional coding blocks which are organized on any of horizontal or vertical block bars, and each additional coding block is identified with any of single or multiple colors, or a bar code.

16. The method of claim 15, wherein said additional blocks are arranged in a series so that each combination of two or more neighbored coding blocks in the series is unique, and each said block bar contains at least one of said series; and wherein said combination of two or more said neighbored coding blocks in said series is any of a pair of said neighbored coding blocks and a combination of multiple said neighbored coding blocks.

17. The method of claim 1, wherein said 2D coding blocks are displayed on said TV screen directly as a background at least during said trigger capturing of TV screen pictures.

18. The method of claim 1, wherein said 2D coding blocks are organized in at least one screen area on said TV screen, and each 2D coding block is identified by any of a unique puzzle line, bar code, or other visual methods.

* * * * *